United States Patent [19]
Keenan

[11] Patent Number: 5,099,233
[45] Date of Patent: Mar. 24, 1992

[54] APPARATUS AND METHOD FOR ADDRESSING MEMORY

[75] Inventor: Douglas M. Keenan, Indianapolis, Ind.

[73] Assignee: Thomson Consumer Electronics, Inc., Indianapolis, Ind.

[21] Appl. No.: 476,651

[22] Filed: Feb. 12, 1990

[30] Foreign Application Priority Data

Apr. 19, 1989 [GB] United Kingdom ............... 8908861

[51] Int. Cl.⁵ ............................................. H04Q 1/00
[52] U.S. Cl. ........................ 340/825.72; 340/825.69; 340/825.52; 340/825.22
[58] Field of Search .............. 340/825.69, 825.72, 340/825.52, 825.22; 455/151, 352; 358/194.1; 364/200, 900, 254, 254.3, 255.1, 255.7, 261, 946.7, 955, 955.5, 957, 957.1, 963.3, 964.6, 414

[56] References Cited
U.S. PATENT DOCUMENTS

| | | | |
|---|---|---|---|
| 4,218,757 | 8/1980 | Drogichen | 364/900 |
| 4,613,953 | 9/1986 | Bush et al. | 364/900 |
| 4,623,887 | 11/1986 | Welles, II | 340/825.57 |
| 4,707,661 | 11/1987 | Hoenninger, III et al. | 364/414 |

OTHER PUBLICATIONS

Microcomputer-Based Design by John B. Peatman, McGraw-Hill Book Company, 1977, pp. 80-81.

Primary Examiner—Donald J. Yusko
Assistant Examiner—Edwin C. Holloway, III
Attorney, Agent, or Firm—Joseph S. Tripoli; Peter M. Emanuel; Thomas F. Lenihan

[57] ABSTRACT

A controller copies a single subroutine from a ROM memory into a RAM memory and modifies the subroutine to enable it to access all locations of a number of irregularly sized matrices by changing the addresses contained in the subroutine in accordance with a list of addresses stored in ROM.

12 Claims, 7 Drawing Sheets

APPARATUS AND METHOD FOR ADDRESSING MEMORY

FIELD OF THE INVENTION

This invention relates to a memory saving arrangement useful in a programmable remote control transmitter for a consumer electronics product such as a VCR, cable converter, videodisc player, television receiver, or the like.

BACKGROUND OF THE INVENTION

A trend in infra-red (IR) remote controls for consumer electronics is the multi-brand universal remote control handunit which controls any one of a number of consumer electronics products manufactured by different manufacturers, and utilizing respective different remote control signal code formats. Universal remote control handunits provide the user with the convenience of using only one remote control handunit, while being able to control most, if not all, of the functions of the consumer electronics products.

To a large degree, the number of different functions and different remote control command signal formats that can be handled by a universal remote control is dependent upon the amount of memory available for remote control code storage.

There are two basic approaches to universal remote control handunits. A random access memory (RAM) based system is often described as a "learning" remote control handunit. This type of remote control handunit requires the user to "teach" the remote control handunit desired functions from his original handunit. This is usually done by switching the "learning" remote control handunit to a "learning mode", and physically orienting the two handunits such that the "learning" remote control handunit can receive the IR transmissions of the handunit to be emulated. This learning process begins as an information storage process, wherein an IR transmission is recorded as it is being received by the learning remote control. After this initial storage of the "raw" data, the raw data is analyzed and compressed, and then the final compressed version of the data is stored in RAM. When the universal remote control handunit is used in the remote control mode to transmit a command, the stored, compressed codes are recalled from memory, decompressed, and the resulting signal is transmitted.

A read-only memory (ROM) based system is restricted to a fixed set of devices, usually television receivers (TVs), videocassette recorders (VCRs), and cable converters. In such a handunit, all of the different code formats for all of the functions for each kind of device to be controlled, must be programmed beforehand. Here also, the remote control codes are usually compressed in some manner to occupy as little memory space as possible.

With each technique, since memory space is limited, the more efficient the compression technique is, the more functions can be stored. Another way to conserve memory space is to reduce the number of program instructions needed to address memory by providing a more efficient routine for addressing memory. The present invention is directed to this end, and is especially concerned with conserving memory space when so-called "indexed-addressing" is utilized.

The use of "matrices" (i.e., groups of memory locations) in microprocessor software is quite common, usually for look-up tables and/or data tables. They are so common, in fact, that most microprocessors contain an "index register" which can be used to access data indirectly. For example, if X=8 and POINTER is the starting point (in memory) of a data table,

LDA POINTER,X fetches the 8th byte after POINTER in memory and stores it in the accumulator. That is, LDA POINTER,X is an instruction which causes the microcomputer to read data from a memory location addressed by the combination of the value of POINTER (a sixteen bit address), plus the value stored in the X register. This is a very powerful technique but it requires a large portion of memory to address certain matrices.

SUMMARY OF THE INVENTION

It is herein recognized that a single subroutine may be used to fetch all data stored in any of a plurality of matrices. In order to address a particular matrix, the single subroutine is modified by the addition of the starting location of the desired matrix. The data relating to the starting locations are stored in a table.

DETAILED DESCRIPTION OF THE EMBODIMENT

Figure 1:
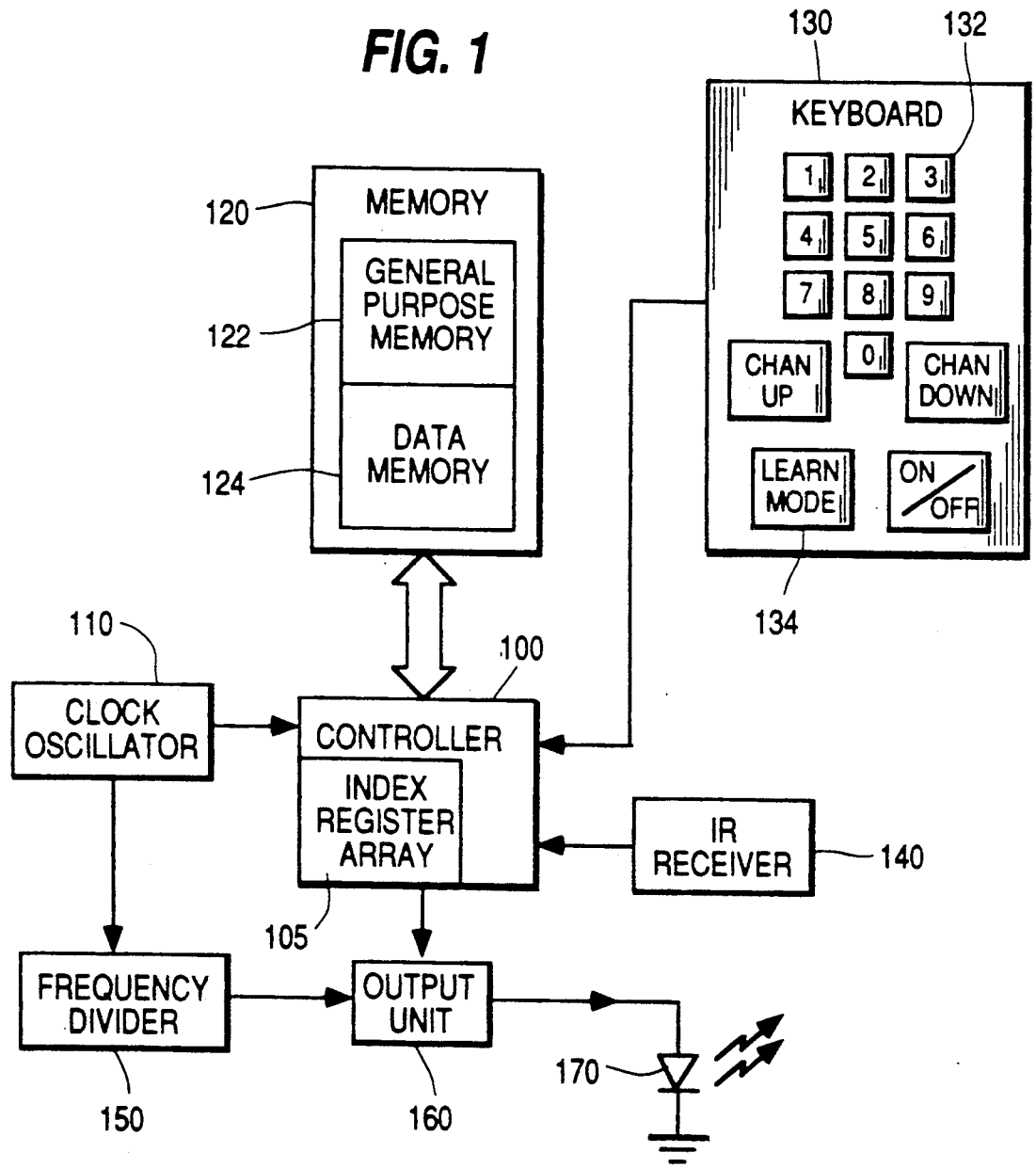
FIG. 1 shows, in block diagram form, a remote control handunit of the learning remote control kind in which the invention may be embodied.

An apparatus, suitable for use as a learning type remote control handunit of the type described above, is shown in FIG. 1. A controller 100 may be a microprocessor (the terms microprocessor and microcomputer as used herein have the same meaning).

Controller 100 receives, from clock oscillator 110, clock signals which establish the timing of the functions of controller 100. Controller 100, in accordance with its programmed instructions, addresses a memory 120 which may or may not be internal to controller 100. Memory 120 includes a general purpose (or scratch pad) area 122, and a data area 124. Controller 100 also receives data entered by a user via a keyboard 130 comprising a group of keys 132 including digit keys 0-9, a channel up key, a channel down key, and a power ON/OFF key. Keyboard 130 may also include a switch 134 for activating a "learning mode" (explained below). This switch is shown on keyboard 130 as a key 134, however, it may be a separate toggle switch located elsewhere on the remote control handunit. In the illustrated embodiment of FIG. 1, key 134 is assumed to exhibit "toggle" characteristic. That is, one pressing of key 134 causes the learning mode to be active, and a second pressing of key 134 returns the remote control handunit to the normal remote control mode, wherein user commands may be sent to the controllable devices.

When in the learning mode, IR receiver 140 receives IR signals transmitted by the remote control handunits to be emulated, and provides digital data representative of those IR signals to controller 100. Controller 100 stores the "raw" (i.e. uncompressed) data in general purpose memory 122. Thereafter the "raw" data is compressed and stored for later retrieval. An example a remote control system which compresses codes for storage is found in U.S. Pat. No. 4,623,887 (Welles,II).

When in the normal remote control mode, when a transmission of a remote control signal for a command is desired, controller 100 decompresses the stored code and passes the resultant decompressed code to an output unit 160 which assembles the proper sequence of bursts and spaces for transmission. Clock oscillator 110 provides a clock signal to a frequency divider 150 which provides a lower frequency signal to output unit 160. This lower frequency signal forms the burst component of the data stream which is applied to IR diode 170 for transmission In the alternative, frequency divider 150 may be eliminated, the burst pulses being generated by controller 100 by "toggling" an output rapidly.

In ROM based systems the compression is not performed by the remote control handunit, but rather is performed at an earlier time in the factory in order to generate compressed control codes which are stored in a ROM. In this case, IR receiver 140 and "learn mode" key 134 would not be present in the remote control handunit.

Figure 2:
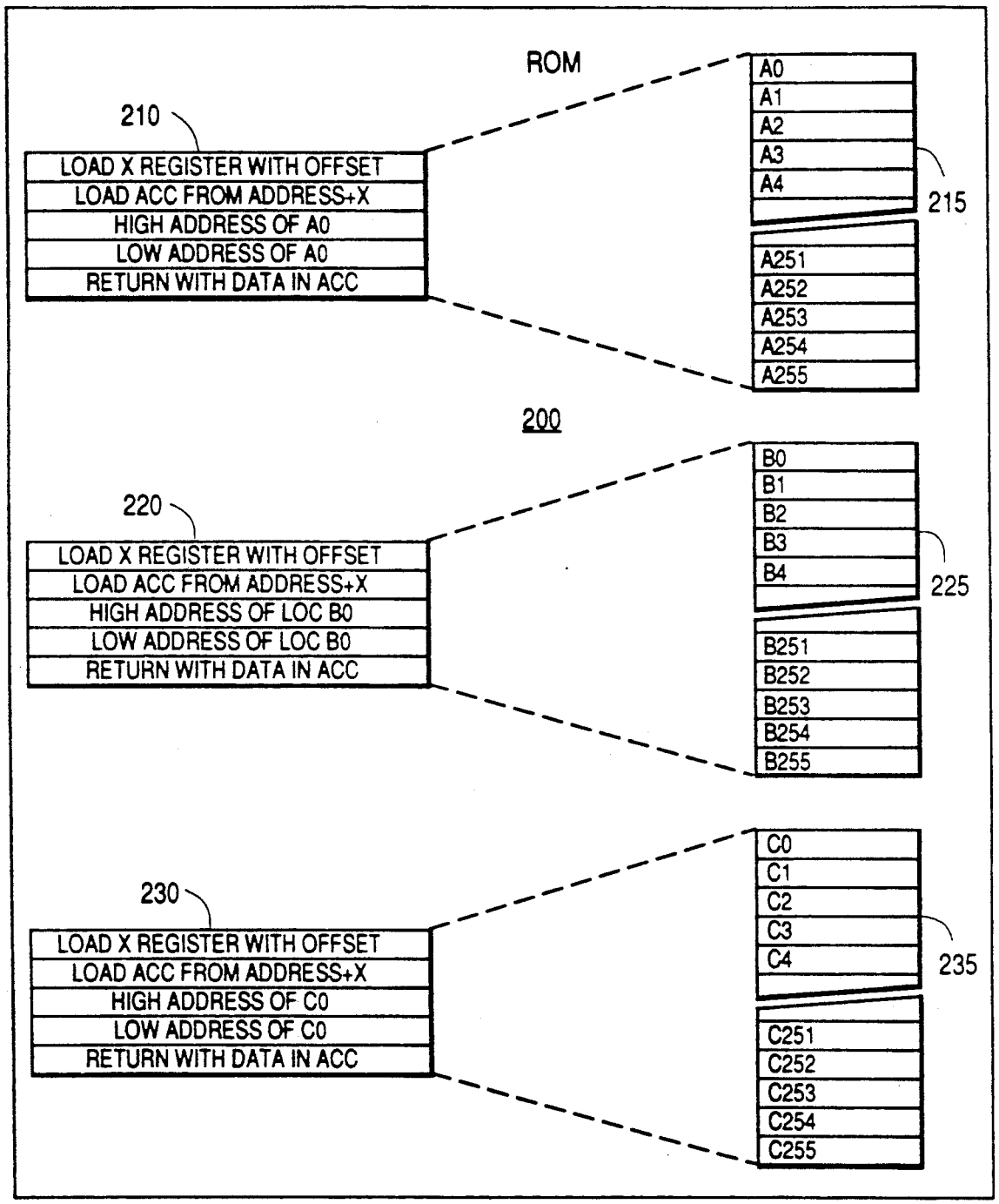
FIG. 2 shows, in block diagram form, a known arrangement of memory locations in a read-only memory (ROM).
Figure 3:
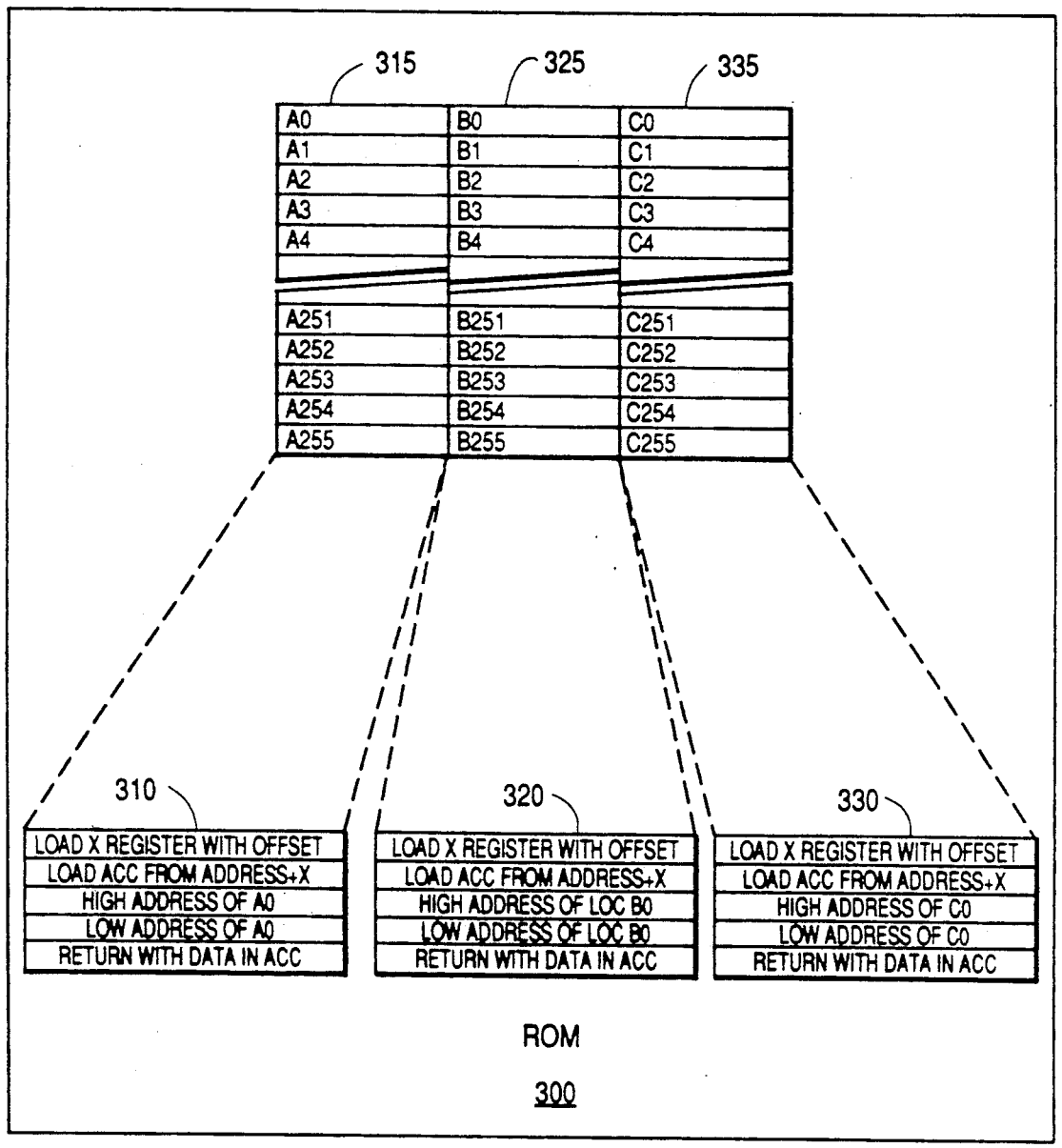
FIG. 3 shows, in block diagram form, an alternate arrangement of the ROM of FIG. 2.
Figure 5:
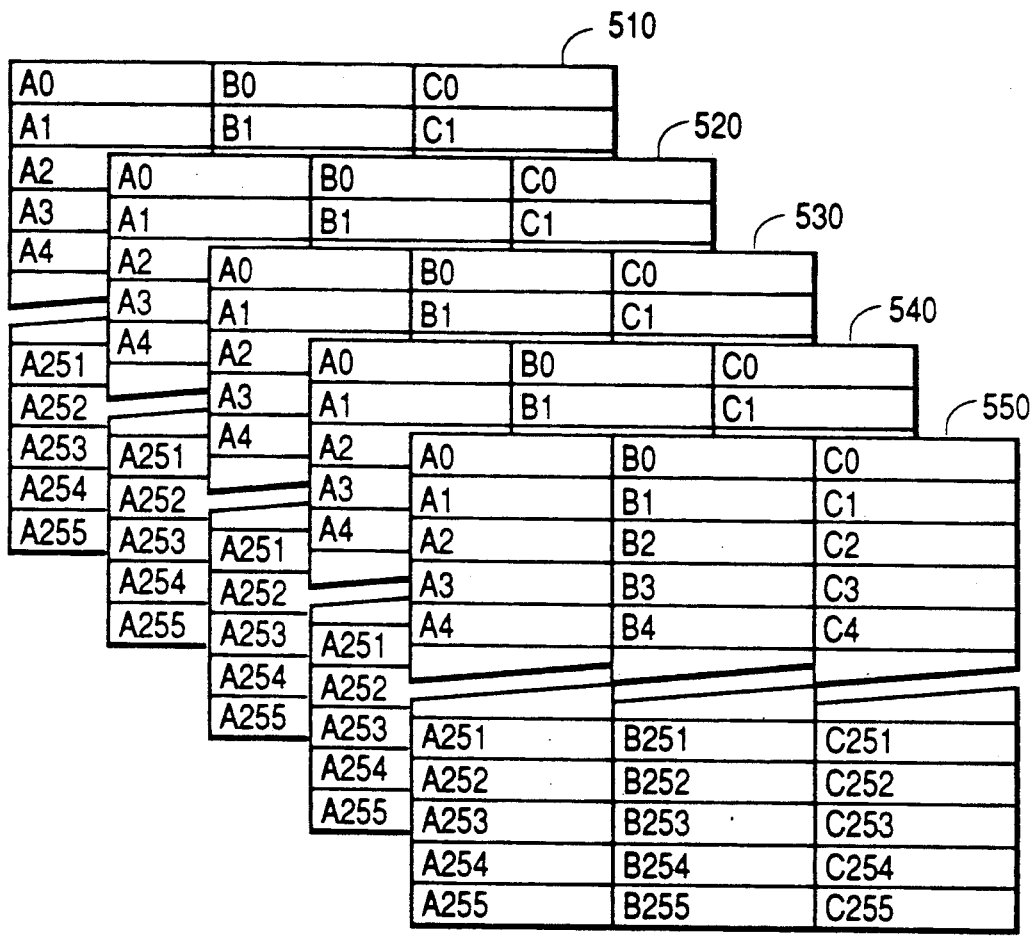
FIG. 5 shows a known arrangement of "pages" of memory.

The individual commands for each device to be controlled are stored in memory in respective locations. FIG. 2 illustrates a number of these locations grouped into a table (i.e. a one-dimensional matrix). While each of groups 215, 225, and 235 of FIG. 2, is illustrated as having 256 memory locations, it is to be understood that each group may have any number of memory locations up to a maximum of number of 256 locations (the limitation of 256 locations will be explained below). It is often convenient for a programmer to arrange groups of memory locations containing related data into a multidimensional matrix. FIG. 3 illustrates a two dimensional matrix wherein the memory locations are arranged into columns and rows (i.e., a two-dimensional matrix). FIG. 5 illustrates a three dimensional matrix comprising "pages" of memory (so-called because when viewed in this manner, the memory arrangement resembles the pages of a book).

Similar reference numerals in FIGS. 2 and 3 identify elements having similar functions. Therefore, only FIG. 3 will be described in detail. As shown in FIG. 3, the individual columns of the matrix (315, 325, 335) are addressed by respective individual subroutines (310, 320, 330), as shown by the dotted lines between respective subroutines and columns. These subroutines utilize an indexed pointer system to address individual rows within a column. The pointer points to the starting address of the desired column (A0, B0, or C0, respectively). An index value contained in a register which exists within the microcomputer. This register is known as the X register. The value contained in the X register is added to the value contained in the pointer register to arrive at a final address of the desired memory location. Since the X register is 8 bits long, it can hold values up to and including 255. Thus, the pointer register value may be "offset" by up to 255 additional memory locations. Small matrices present no problem for a single 8-bit index register, even when consisting of several dimensions.

For a multiple-dimension matrix $M(i,j,k, \ldots )$ where $$i < 2^{}n_i, j < 2^{}n_j, k < 2^{**}r_k, \ldots$$

and $$n_i + n_j + n_k + \ldots <= 8,$$

(Where the notation $2^{**}n_i$ is known in the computer programming art to mean 2 raised to the power of $n_i$). M can be allocated by simply bit mapping the index register as $$n_i \text{ bits} + n_j \text{ bits} + n_k \text{ bits} + \ldots$$

By way of example, in the above-given equation, "i" could represent the number of a particular column of a matrix, "j" could represent the number of a particular row of a matrix, and "k" could represent a particular page of columns and rows (as shown in FIG. 5).

Thus, any multiple-dimension matrix in which $i \times j \times k \times \ldots <= 256$ bytes can thus be handled by simply considering it as a one-dimensional matrix and using the index register directly. This technique is well known and frequently used, although it is not necessarily the most efficient way to handle such a matrix. For larger matrices, i.e., where $n_i + n_j + n_k + \ldots > 8$, another method of addressing must be found.

Figure 3A:
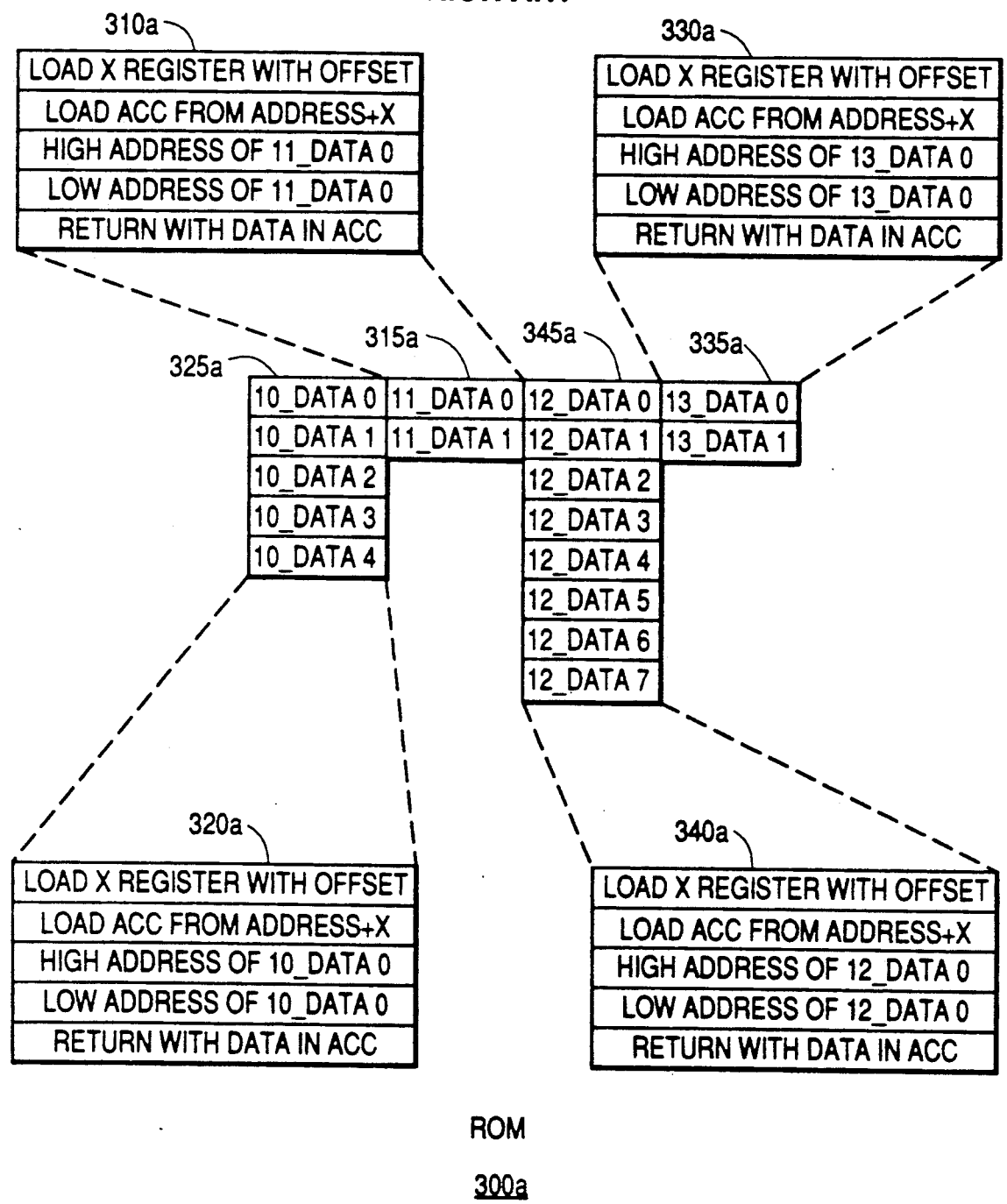
FIG. 3a shows, in block diagram form, an example of an irregular matrix of memory locations.

Certain matrices, called irregular matrices, utilize only certain ranges of elements (e.g., elements $j0-j_4$ in $i_0$, elements $j_0-j_1$ in $i_1$, elements $j_0-j_7$ in $i_2$, etc.). An example of such an irregular matrix is shown in FIG. 3a. To allocate memory for all of the unused bytes in such a matrix means that a large portion of memory space is wasted. A typical approach to addressing irregular matrices is to pass the row index to a column-indexed subroutine which fetches the data. This can best be shown by example. For instance, to fetch the data byte stored in memory location I2.DATA 5 of FIG. 3a (memory element i=2, j=5, where $M(i<4, j<8)$), the following subroutine (written in assembly language for the MOTOROLA 6805 microprocessor) can be used. Those skilled in the art will recognize I0.DATA to be a sixteen bit pointer to the start of the data table. Alternatively, I0.DATA can be thought of as a label representing the sixteen bit address of I0.DATA 0, the first location of the matrix of memory locations.

```
GET_VALUE:            ;ASSUMES A = I_INDEX, X = J_INDEX
        STX   J_INDEX  ;STORE J_INDEX TEMPORARILY
        STA   I_INDEX  ;STORE I_INDEX TEMPORARILY
        LSLA           ;ACC = I_INDEX * 2
        LSLA           ;ACC = I_INDEX * 4
        ADD   I_INDEX  ;ACC = I_INDEX * 5
        TAX            ;LOAD INDEX REGISTER
        LDA   J_INDEX  ;RECOVER J_INDEX
```

-continued

```
         JMP    I0.GET,X          ;RETURN TO CALLER WITH DATA
  ;
  ;
I0_GET   TAX                      ;THIS COMMAND TAKES 1 BYTE
         LDA    I0_DATA,X         ;THIS COMMAND TAKES 3 BYTES
         RTS                      ;THIS COMMAND TAKES 1 BYTE
I1_GET   TAX                      ;5 BYTES/COLUMN
         LDA    I1_DATA,X
         RTS
I2_GET:  TAX
         LDA    I2_DATA,X
         RTS
  ;

I0_DATA: DB     00                ;ONLY FIVE ROWS IN COLUMN 0
         DB     01
         DB     02
         DB     03
         DB     04
I1_DATA: DB     10                ;ONLY TWO ROWS IN COLUMN 1
         DB     11
I2_DATA: DB     20                ;EIGHT ROWS IN COLUMN 2
         DB     21
         DB     22
         DB     23
         DB     24
         DB     25                ;DESIRED DATA IS HERE
         DB     26
         DB     27
I3_DATA: DB     30
         DB     31
  .
```

In the above example, separate subroutines, I0.GET, I1.GET, and I2.GET are used to access the data from each respective matrix. For simplicity, a fourth similar subroutine I3.GET is not listed. These separate subroutines are identified in FIG. 3a by reference numerals 310a, 320a, 330a, and 340a, respectively. Each of these separate subroutines is stored in ROM, and is 5 bytes in length. Note that each subroutine is stored in ROM, each cannot be modified and must therefore include the sixteen bit address of the particular column to be addressed (e.g.,HIGH ADDRESS OF I0.DATA 0, LOW ADDRESS OF I0.DATA 0).

The above-listed routine is entered a GET.VALUE, which is a section of the program which evaluates the I index (i.e., the pointer to the desired column) and calculates an address to which the microcomputer will jump in order to fetch the desired data. The I0.GET subroutine begins at memory location I0.GET+0, The I1. GET subroutine begins at I0.GET+5. Similarly the I2.GET subroutine begins at I0.GET+10. Thus, in order to make the jump properly to the correct subroutine to fetch the desired data, the index must be multiplied by 5, as shown in the GET.VALUE routine listed above. Note that of the 5 bytes of each of the I0.GET, I1.GET, I2.GET, etc. subroutines, 3 of the bytes (TAX, LDA, and RTS) are identical and are repeated in each subroutine. For such a small matrix, this method is highly inefficient. However, for larger tables this approach has been used in order not to waste large amounts of memory. Note that this method is restricted to I.INDEX< =51 because 5 times 51 equals 255, the largest value which can be stored in the eight bit X register), or else the column jump cannot be made correctly.

Although this technique references matrices with somewhat larger indices, the code required to implement it expands very quickly for multiple rows. As noted above, this technique applies only to matrices with less than 51 columns and 256 rows. The apparatus and method described herein overcomes these limitations.

Instead of using indexed-by-column subroutines to fetch the desired row data, apparatus according to the present invention uses one general subroutine to fetch data from all columns.

Figure 4:
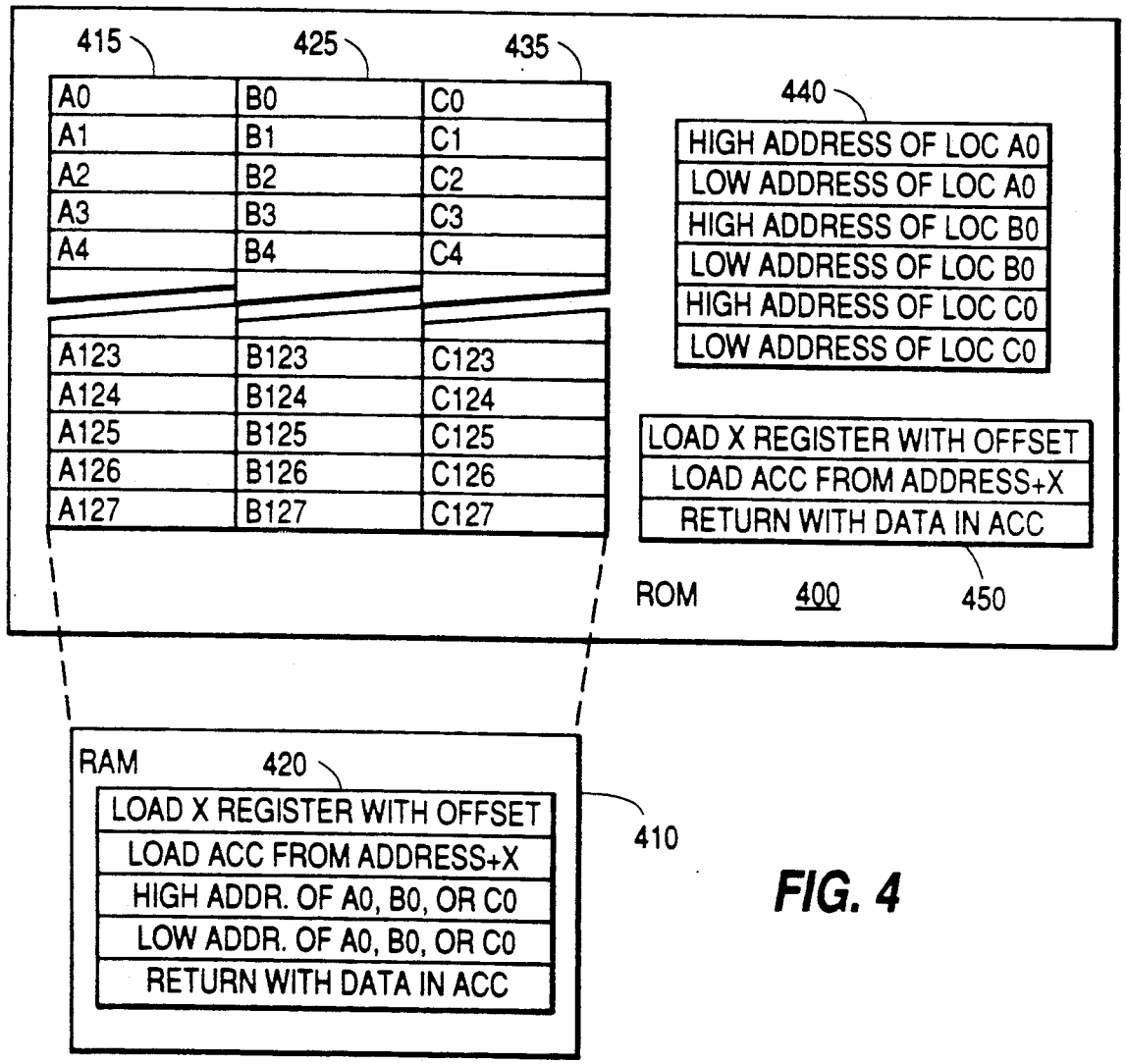
FIG. 4 shows, in block diagram form, an embodiment of the invention.

The present invention will now be described with reference to FIG. 4. As noted above, all of the indexed-by-column subroutines share the same size and form

```
TAX              ;FETCH ROW INDEX
LDA   COLUMN,X   ;FETCH DATA
RTS              ;RETURN TO CALLER WITH DATA.
```

In accordance with the present invention, upon initialization, this general subroutine (FETCH) 450 is retrieved from ROM 400 and is stored, opcode by opcode, as a single subroutine 420 in a RAM 410, and accessed in the following manner:

```
FETCH:  LDA   COLUMN,X   ;FETCH DATA
        RTS              ;RETURN TO CALLER
                          WITH DATA
```

In RAM space this is defined as:

```
FETCH
LDA_OPCODE   DB   1   ;LDA OPCODE PLACED HERE
HIGH_INDX    DB   1   ;HIGH BYTE OF COLUMN
                       ADDRESS
```

| | | |
|---|---|---|
| -continued | | |
| LOW_INDX | DB 1 | ;LOW BYTE OF COLUMN ADDRESS |
| RTS_OPCODE | DB 1 | ;RTS OPCODE PLACED HERE |

The RAM bytes LDA.OPCODE and RTS.OPCODE are initialized to the correct opcode for that particular microprocessor before the routine is called, and after that their values do not change. That is, the memory location LDA.OPCODE is loaded with the code byte which when executed will cause the controller to read a byte of data stored in the memory location whose address is stored immediately after this instruction, offset by the value stored in the X register.

When the FETCH routine is first read from ROM and stored in RAM, memory locations HIGH.INDX and LOW.INDX may have meaningless data stored therein. The data in memory locations HIGH.INDX and LOW.INDX point to the start of the respective matrix (i.e., group of memory locations) in which the desired data is stored. The correct data is written into these locations as follows.

The FETCH subroutine is called by the following routine, which accesses a table (COLUMN.PTR) 440 of contiguously stored addresses called column pointers, and stores the column pointers in memory locations HIGH.INDX and LOW.INDX.

I0.DATA, I1.DATA, etc. are 16 bit addresses, stored as two eight bit bytes with the high eight bits of the address occurring first. Because each of these addresses is 2 bytes in length, the address of I0.DATA begins at memory location COLUMN.PTR+0, the address of I1.DATA begins at COLUMN.PTR+2, and the address of I2.DATA begins at COLUMN.PTR+4. Thus, in order to properly access the correct address to fetch the desired data, the index must be multiplied by 2, as shown in the GET.VALUE routine listed immediately above. This technique can reference matrices with up to 128 columns (0–127) and 256 rows (0–255), and requires much less memory to do so. The limitation of 128 columns comes from 0–127 columns times 2 bytes each, the last count of which is equal to 255, the highest value which can be stored in the eight bit X register. This extended data accessing capability comes at the small expense of adding ROM-based code which initializes the "program" RAM with the proper codes.

It is noted that an additional byte in the GET.VALUE routine may be saved by deleting the INCX instruction, and changing the instruction immediately preceding the STA LOW.INDX to LDA COLUMN.PTR+1,X.

If necessary, matrices as large as 256 columns by 256 rows may be addressed by modifying the above-listed programs as shown below.

```
GET_VALUE:           ;ASSUMES A = I_INDEX , = J_INDEX
;
        STX     ROW_INDEX       ;ROW INDEX STORED
        LSLA                    ;ACC = COLUMN * 2
        TAX                     ;PUT COLUMN * 2 IN INDEX
        LDA     COLUMN_PTR,X    ;FETCH HIGH BYTE OF COLUMN
INDEX
        STA     HI_INDX         ;STORE AWAY
        INCX                    ;POINT TO LOW BYTE
        LDA     COLUMN_PTR,X    ;FETCH LOW BYTE OF INDEX
        STA     LOW_INDX        ;STORE AWAY
        LDX     ROW_INDEX       ;PREPARE FOR ROW INDEX
        JMP     FETCH           ;ADD FETCH DATA
COLUMN_PTR:
        DB      HIGH  I0_DATA   ;COLUMN 0 ADDRESS (HIGH BYTE)
        DB      LOW   I0_DATA   ;COLUMN 0 ADDRESS (LOW BYTE)
        DB      HIGH  I1_DATA   ;COLUMN 1 ADDRESS (HIGH BYTE)
        DB      LOW   I1_DATA   ;COLUMN 1 ADDRESS (LOW BYTE)
        DB      HIGH  I2_DATA   ;COLUMN 2 ADDRESS (HIGH BYTE)
        DB      LOW   I2_DATA   ;COLUMN 2 ADDRESS (LOW BYTE)
        DB      HIGH  I3_DATA   ;COLUMN 3 ADDRESS (HIGH BYTE)
        DB      LOW   I3_DATA   ;COLUMN 3 ADDRESS (LOW BYTE)
```

```
            GET_VALUE:           ;ASSUMES A = I_INDEX , = J_INDEX
;
                    STX     ROW_INDEX       ;ROW INDEX STORED
                    TAX                     ;PUT COLUMN IN INDEX
                    LDA     HI_COL_PTR,X    ;FETCH HIGH BYTE OF COLUMN
            INDEX
                    STA     HI_INDX         ;STORE AWAY
                    LDA     LO_COL_PTR,X    ;FETCH LOW BYTE OF INDEX
                    STA     LOW_INDX        ;STORE AWAY
                    LDX     ROW_INDEX       ;PREPARE FOR ROW INDEX
                    JMP     FETCH           ;ADD FETCH DATA
            HI_COL_PTR:
                    DB      HIGH  I0_DATA   ;COLUMN 0 ADDRESS (HIGH BYTE)
                    DB      HIGH  I1_DATA   ;COLUMN 1 ADDRESS (HIGH BYTE)
                    DB      HIGH  I2_DATA   ;COLUMN 2 ADDRESS (HIGH BYTE)
                    DB      HIGH  I3_DATA   ;COLUMN 3 ADDRESS (HIGH BYTE)
            LO_COL_PTR:
                    DB      LOW   I0_DATA   ;COLUMN 0 ADDRESS (LOW BYTE)
                    DB      LOW   I1_DATA   ;COLUMN 1 ADDRESS (LOW BYTE)
                    DB      LOW   I2_DATA   ;COLUMN 2 ADDRESS (LOW BYTE)
```

```
-continued
DB     LOW   13_DATA    ;COLUMN 3 ADDRESS (LOW BYTE)
```

Figure 6:
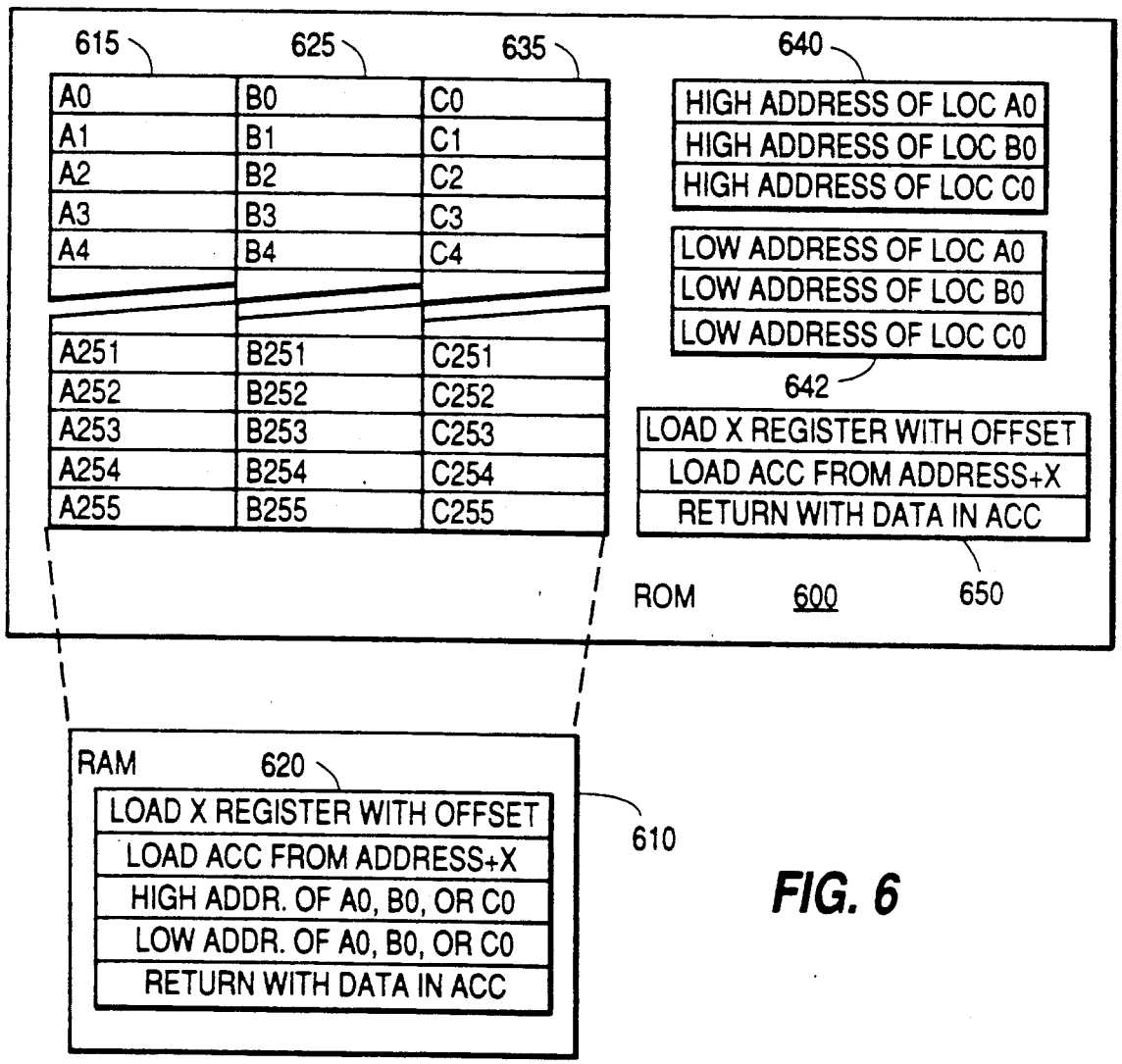
FIG. 6 shows, in block diagram form, an embodiment of the invention.

In the present example, the high and low bytes of the column pointer are stored in separate tables (HI.COL.PTR and LO.COL.PTR), as shown in FIG. 6. Both tables are indexed by the same value stored in the X register. Thus, there is no need to multiply the index value by 2 to "jump over" the low bytes as in the previous example. Since no multiplication by 2 is required, all 256 addressable locations may be used to store the starting locations of the matrices.

While the subject invention was described with respect to an embodiment in a remote control handunit, the scope of the invention is not intended to be limited to that environment.

What is claimed is:

1. Apparatus for addressing a memory device, comprising:
   memory means, said memory means including,
   a first memory area containing program instructions stored as data;
   a second memory area comprising a matrix of memory locations of said memory means, said matrix being arranged in columns and rows;
   a third memory area containing data comprising addresses of said columns of said matrix;
   a fourth memory area; and
   control means coupled to said first, second, third, and fourth memory areas for reading said program instructions stored as data from said first memory area, storing said program instructions in said fourth memory area, reading said addresses from said third memory area, modifying said data stored in said fourth memory area by storing said addresses of said columns to form executable instructions, and executing said instructions in said fourth memory area to access said memory locations of said matrix.

2. The apparatus of claim 1 wherein said memory means comprises alterable memory means and nonalterable memory means, and said nonalterable memory means includes said first, second, and third memory areas.

3. The apparatus of claim 2 wherein said alterable memory means includes said fourth memory area.

4. The apparatus of claim 3 wherein said second memory area comprises a plurality of matrices.

5. The apparatus of claim 4 wherein said plurality of matrices include respective different numbers of columns and rows.

6. Apparatus for use in a remote control unit for addressing a memory device, comprising:
   memory means, said memory means including, a ROM area containing program instructions stored as data, a plurality of memory locations of said memory means, said plurality of memory locations being arranged in a plurality of groups, and data comprising addresses of the respective starting locations of said groups;
   a RAM area; and
   control means coupled to said ROM and RAM areas for reading said program instructions stored as data from said ROM area, storing said program instructions in said RAM area, reading said addresses from said ROM area, modifying said data stored in said RAM area by storing said respective starting addresses of said groups to form executable instructions, and executing said instructions in said RAM area to access said memory locations of said groups.

7. The apparatus of claim 6 wherein each group of said plurality of groups includes respective different numbers of memory locations.

8. Apparatus for addressing a memory device, comprising:
   memory means, said memory means including, a ROM area containing program instructions, program instructions stored as data, a plurality of memory locations of said memory means, said plurality of memory locations being arranged in a plurality of groups, and data comprising a table of contiguously stored addresses of the respective starting locations of said groups;
   a RAM area; and
   control means coupled to said ROM and RAM areas for storing a single subroutine in said RAM area, reading said addresses from said ROM area, modifying said single subroutine stored in said RAM area by storing said respective starting addresses of said groups in said single subroutine, and executing said single subroutine in said RAM area to access all of said memory locations of all of said groups.

9. The apparatus of claim 8 wherein each group of said plurality of groups includes respective different numbers of memory locations.

10. The apparatus of claim 9 wherein the limit of the number of said plurality of groups is 128.

11. The apparatus of claim 9 wherein the limit of the number of said plurality of groups is 256.

12. A method for addressing a memory device, comprising the steps of:
   reading program instructions stored as data from a first memory area;
   storing said program instructions in a second memory area;
   reading addresses of columns of a matrix of memory locations from a third memory area, said matrix occupying a fourth memory area and said matrix being arranged in columns and rows;
   modifying said data stored in said second memory area by storing said addresses of said columns to form executable instructions; and
   executing said instructions in said second memory area to access said memory locations of said matrix.

* * * * *